US012743661B2

(12) United States Patent
Kotriwala et al.

(10) Patent No.: US 12,743,661 B2
(45) Date of Patent: Sep. 22, 2026

(54) OUTLIER DETECTION BASED ON PROCESS FINGERPRINTS FROM ROBOT CYCLE DATA

(71) Applicant: ABB Schweiz AG, Baden (CH)

(72) Inventors: Arzam Muzaffar Kotriwala, Ladenburg (DE); Benjamin Kloepper, Mannheim (DE); Ido Amihai, Heppenheim (DE); Taisuke Minagawa, Barcelona (ES); Dominik Olschewski, Frankfurt am Main (DE); Kai Merz, Wöllstadt (DE)

(73) Assignee: ABB Schweiz AG, Baden (CH)

( * ) Notice: Subject to any disclaimer, the term of this patent is extended or adjusted under 35 U.S.C. 154(b) by 831 days.

(21) Appl. No.: 18/171,732

(22) Filed: Feb. 21, 2023

(65) Prior Publication Data

US 2023/0274189 A1 Aug. 31, 2023

Related U.S. Application Data

(63) Continuation of application No. PCT/EP2020/073538, filed on Aug. 21, 2020.

(51) Int. Cl.
*G06N 20/00* (2019.01)
*G06F 16/906* (2019.01)

(52) U.S. Cl.
CPC .......... *G06N 20/00* (2019.01); *G06F 16/906* (2019.01)

(58) Field of Classification Search
CPC ...... G06F 16/953; G06F 16/906; G06N 20/00
(Continued)

(56) References Cited

U.S. PATENT DOCUMENTS

2018/0284737 A1 10/2018 Cella et al.
2019/0197237 A1 6/2019 Aguayo Gonzalez et al.
(Continued)

FOREIGN PATENT DOCUMENTS

CA 3021642 A1 10/2017
CA 3019997 A1 4/2020
(Continued)

OTHER PUBLICATIONS

Deshpande et al., "PulSec: Secure Element based framework for sensors anomaly detection in Industry 4.0," *IFAC PapersOnline*, 52(13): 1204-1209 (Dec. 25, 2019).
(Continued)

*Primary Examiner* — Hung T Vy
(74) *Attorney, Agent, or Firm* — Whitmyer IP Group LLC

(57) ABSTRACT

A system and method for outlier detection based on process fingerprints from robot cycle data includes a data collection component, which is configured to collect cyclic data, wherein the cyclic data comprises multiple vectors each of which comprises data from one individual cycle of the robot cycle data; a data storage component, wherein which is configured to store the collected cyclic data; and a data processing component, which is configured to perform cloud processing of the stored cyclic data triggered by a cycle-start signal, wherein the data processing component is configured to parse the stored cyclic data and to process the stored cyclic data based on a configuration file defining metadata of the stored cyclic data, wherein the data processing component is configured extract process fingerprints from the stored cyclic data using the metadata.

16 Claims, 3 Drawing Sheets

(58) Field of Classification Search
USPC .......................................................... 707/737
See application file for complete search history.

(56) References Cited

U.S. PATENT DOCUMENTS

2020/0133254 A1* 4/2020 Cella .................. G05B 23/0283
2020/0160126 A1* 5/2020 Malach ................ G06V 20/584
2021/0237276 A1* 8/2021 Shah .................... G05D 1/0282

FOREIGN PATENT DOCUMENTS

CN 106368813 A 2/2017
CN 106960059 A 7/2017
CN 107918914 A 4/2018
CN 108319981 A 7/2018
CN 110210530 A 9/2019

OTHER PUBLICATIONS

Wu, “Research on Multi-faults Diagnosis technology of thruster and sensor for AUV,” *Dissertation for the Degree of D. Eng., Harbin Engineering University*, 142 pp. (Jun. 2011).
The Patent Office of the People’s Republic of China, Office Action in Chinese Patent Application No. 202080103311.4, 10 pp. (May 30, 2025).
European Patent Office, International Search Report in International Patent Application No. PCT/EP2020/073538, 4 pp. (May 19, 2021).
European Patent Office, Written Opinion in International Patent Application No. PCT/EP2020/073538, 7 pp. (May 19, 2021).

* cited by examiner

OUTLIER DETECTION BASED ON PROCESS FINGERPRINTS FROM ROBOT CYCLE DATA

CROSS-REFERENCE TO RELATED APPLICATIONS

This patent application claims priority to International Patent Application No. PCT/EP2020/073538, filed on Aug. 21, 2020, which is incorporated herein in its entirety by reference.

FIELD OF THE DISCLOSURE

The present disclosure relates to a system and a method for outlier detection based on process fingerprints from robot cycle data.

BACKGROUND OF THE INVENTION

Industrial robots perform diverse tasks, resulting in data generated by one robot being markedly different from that generated by another. This causes serious problems to artificial intelligence, AI, methods, since models learned using the data from one robot cannot be generalized to additional robots.

BRIEF SUMMARY OF THE INVENTION

The present disclosure advantageously describes an improved technique to adapt quickly to different robots. In a first aspect, there is provided a system for outlier detection based on process fingerprints from robot cycle data; the system comprising: a data collection component, which is configured to collect cyclic data, wherein the cyclic data comprises multiple vectors each of which comprises data from one individual cycle of the robot cycle data; a data storage component, wherein which is configured to store the collected cyclic data; and a data processing component, which is configured to perform cloud processing of the stored cyclic data triggered by a cycle-start signal, wherein the data processing component is configured to parse the stored cyclic data and to process the stored cyclic data based on a configuration file defining metadata of the stored cyclic data, wherein the data processing component is configured to extract process fingerprints from the stored cyclic data using the metadata.

In one embodiment, process fingerprints or segments that are extracted from the data and occur across robots and cycles are generated. Subsequently, artificial intelligence (AI) methods are trained using these data, which data can be generalized to an entire robot fleet.

This process can also be applied for predictive maintenance by discovering outliers/anomalies in the process fingerprints of robots, and for process monitoring by tracking changes to the fingerprints over time. The process can also generate a summary of cycles where various anomaly algorithms are applied, which could be correlated with other data sets to create a prediction of machine failure.

Embodiments in accordance with the present disclosure advantageously enable:

i) extracting a reference signal;

ii) signal segmentation and transformation based on the reference signal;

iii) fingerprint generations by clustering the shorter segments using a machine learning clustering algorithm;

iv) a machine learning algorithm or statistical model is trained on each cluster of segments and outlier/anomaly scores are calculated based on the distance to the mean/boundary of the distributions of each cluster; or v) data from robots not used in the training steps are clustered, and their anomaly scores are calculated, based on the closest identified process fingerprint in the training data.

In a second aspect, there is provided a method. As a first step of the method collecting of cyclic data is performed, wherein the cyclic data comprises multiple vectors each of which comprises data from one individual cycle of the robot cycle data; As a second step of the method storing the collected cyclic data is performed.

As a third step of the method, performing cloud processing of the stored cyclic data triggered by a cycle-start signal is performed, wherein the cloud processing of the stored cyclic data comprises a step of parsing the stored cyclic data and a step of processing the stored cyclic data based on a configuration file defining metadata of the stored cyclic data, wherein step of parsing the stored cyclic data comprises extracting process fingerprints from the stored cyclic data using the metadata.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figure 1:
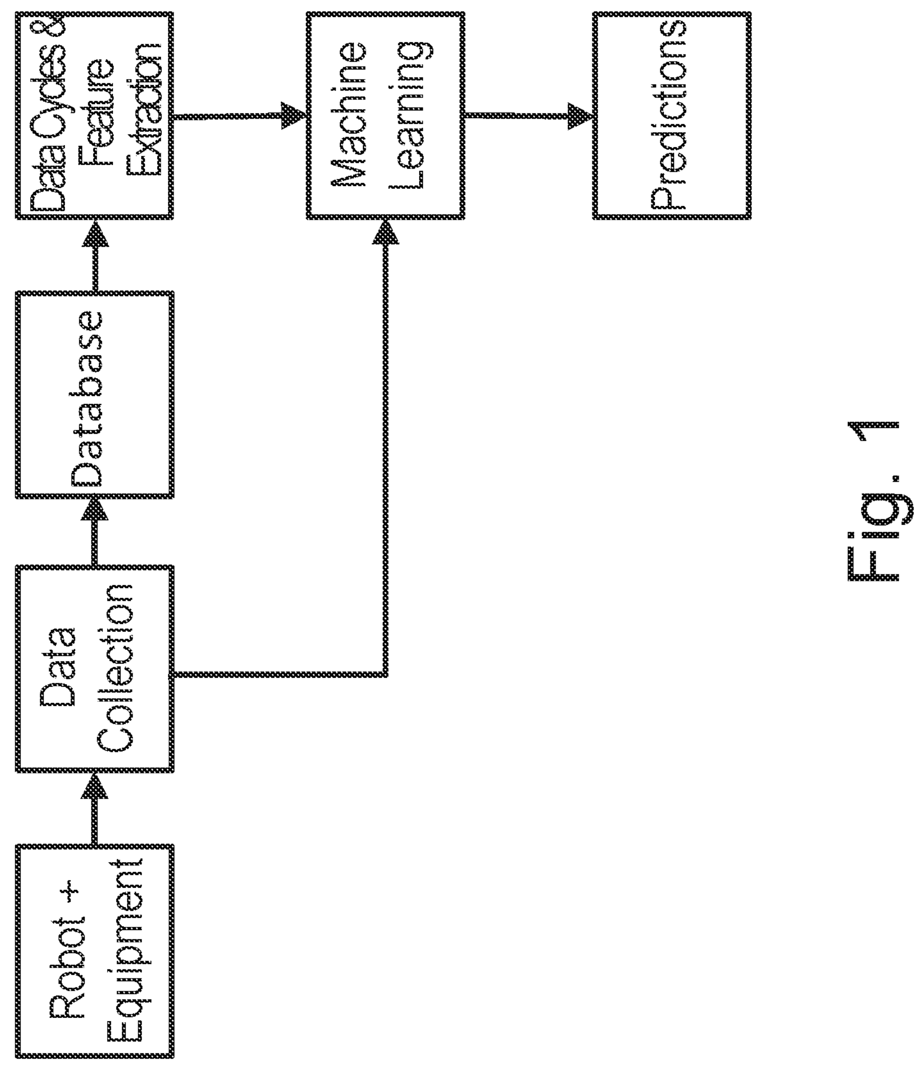
FIG. 1 shows a schematic illustration of a flowchart for a schematic process diagram according to an exemplary embodiment of the present patent application.
Figure 2:
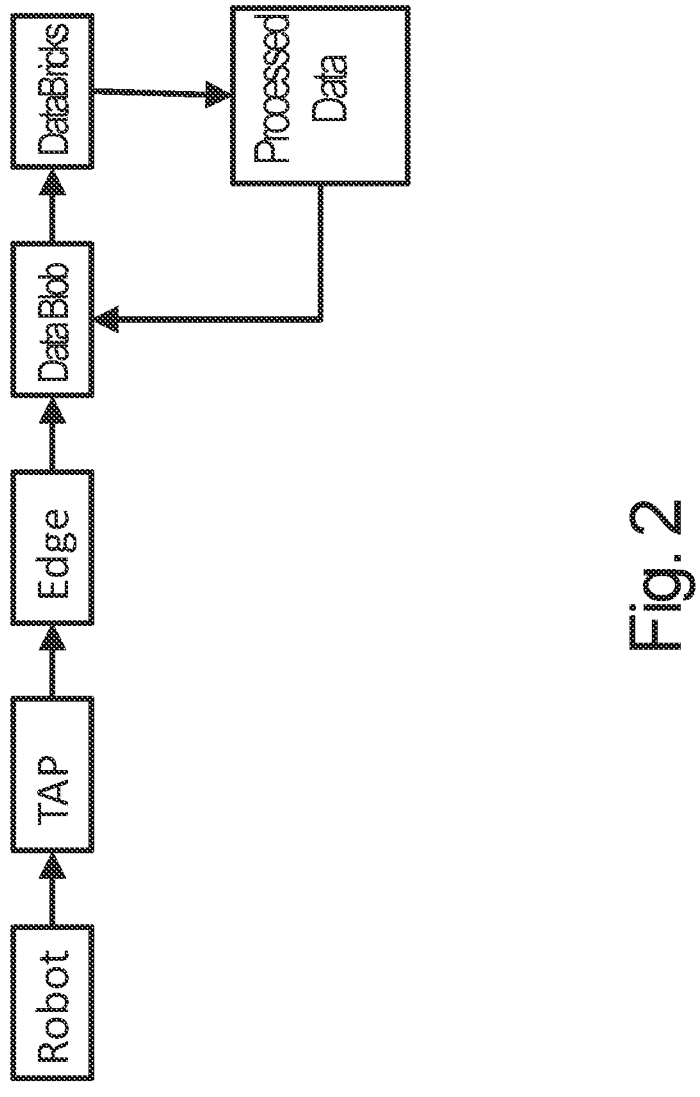
FIG. 2 is a flowchart for a method of data collection and data processing according to an exemplary embodiment of the present patent application.

FIG. 1 shows a schematic illustration of schematic process diagram according to an exemplary embodiment of the present patent application. At first, according to an exemplary embodiment, the extracting of a reference signal is performed as described below.

The data of the robot's required signal data (e.g., position) is identified for instance by examining the data feature names. According to an exemplary embodiment of the present disclosure, one signal will be the reference signal used to create segments.

Secondly, according to an exemplary embodiment, signal segmentation and transformation may be provided as follows: According to an exemplary embodiment of the present disclosure, based on the reference signal, data is segmented into shorted segments.

According to an exemplary embodiment of the present disclosure, the segmentation points can be either provided as input from the robot or calculated, e.g. as local minima points where the minima persist for several seconds, threshold values, creating equally sized (overlapping) slices, randomly sized overlapping slices, etc.

Subsequently, according to an exemplary embodiment, the following is performed: According to an exemplary embodiment of the present disclosure, the fingerprint generations may be provided as follows: Fingerprints are created by clustering the shorter segments using a machine learning clustering algorithm (e.g. DBScan—Density-Based Spatial Clustering of Applications with Noise —, Hierarchical Clustering) and a distance function, possibly calculated after transforming the numerical data to symbols using the Symbolic Aggregate approximation in Vector Space Model (SAX-VSM).

This way, the present invention advantageously allows that the fingerprints are sets of similarly shaped signals, capturing certain types of robot or equipment process (e.g. opening and closing of welding guns).

Subsequently, according to an exemplary embodiment, the following is performed: A machine learning algorithm is trained on each cluster of segments to generate descriptions of the data distributions, and anomaly scores are calculated based on the distance to the boundary of the distributions.

According to an exemplary embodiment of the present disclosure, the input data to the machine learning algorithms is not limited to the reference signal, but can include other signals as well.

According to an exemplary embodiment of the present disclosure, the segmentation points used for all signals are derived from the reference signal. This process according to an exemplary embodiment of the present disclosure can also be used to generate a summary of one cycle where various anomaly algorithm were applied.

In other words, the present disclosure advantageously allows that this can be correlate to other datasets, e.g., maintenance information, to create a prediction of machine failure.

According to an exemplary embodiment of the present disclosure, subsequently, the following is performed: According to an exemplary embodiment of the present disclosure data from robots not used in the training steps are clustered, and their anomaly scores are calculated, based on the closest identified process fingerprint in the training data.

According to an exemplary embodiment of the present disclosure, fast generation of robot-cycle data using Cloud Platforms (e.g., Apache Spark and Databricks) is provided.

According to an exemplary embodiment of the present disclosure, organization of the data into vectors so that each one consists of data from an individual cycle is provided. This will fill a gap between the process engineer and data scientist.

According to an exemplary embodiment of the present disclosure normally data algorithms do not possess quality cycle data, but the present disclosure provides a platform where data algorithms could process on data and share the processing results in an agile manner.

According to an exemplary embodiment of the present disclosure, direct acquisition of data from PROFINET regardless of robot vendor is provided.

According to an exemplary embodiment of the present disclosure, the system can be composed of a data collection and storage component and a data processing component.

According to an exemplary embodiment of the present disclosure, the data collection component includes a network device, an Edge device, and a data storage component (e.g., Azure Data Blob).

According to an exemplary embodiment of the present disclosure, the data processing component includes a computer with Cloud Processing capabilities (e.g. an Apache Spark and Databricks subscription).

According to an exemplary embodiment of the present disclosure, the start and end of each data cycle is identified via a "cycle-start/-stop" signal and cyclic data can be compared using statistical or machine learning algorithms.

Figure 3:
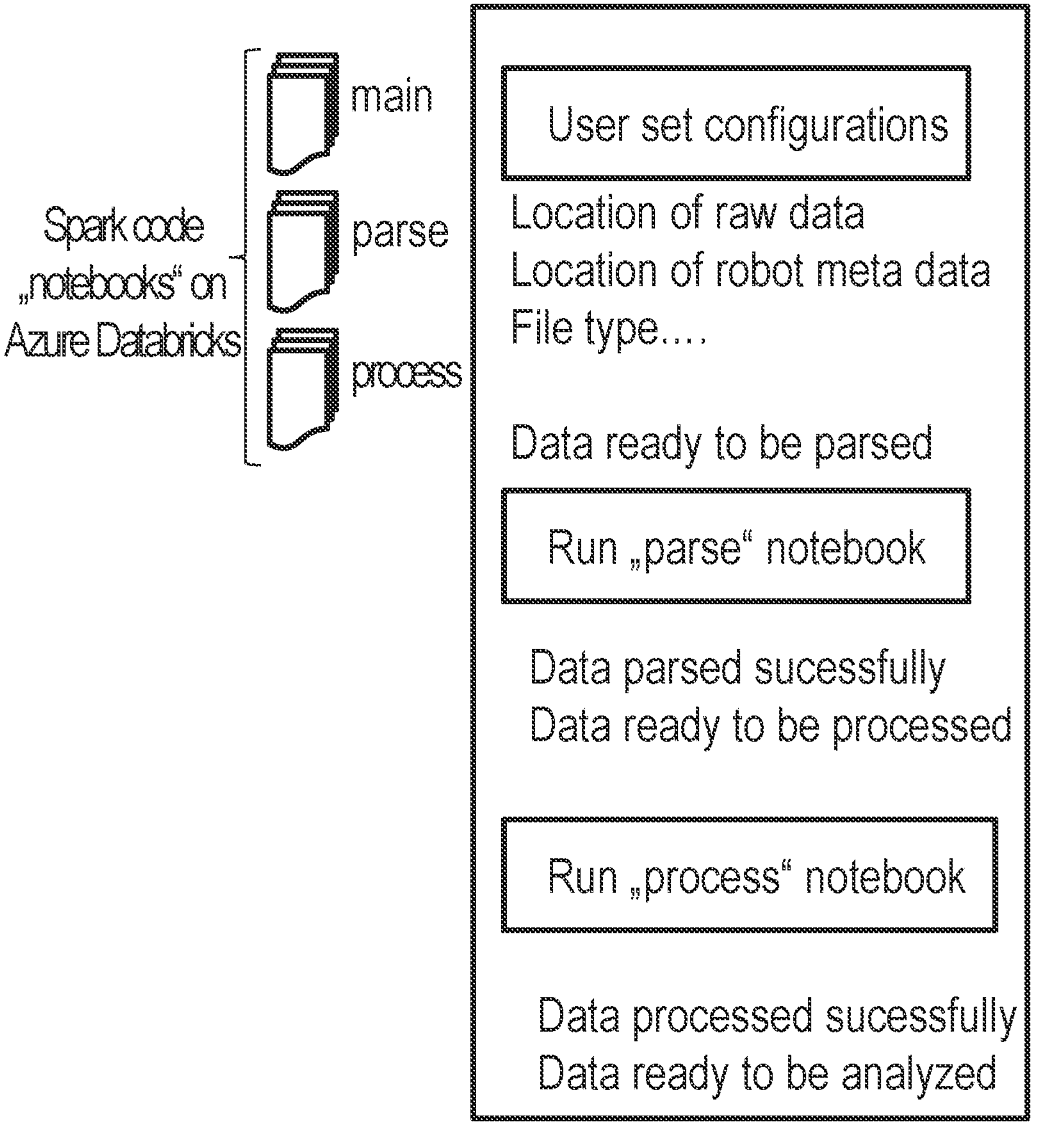
FIG. 3 is a flowchart of a data processing process according to an exemplary embodiment of the present patent application.

FIG. 3 shows an example of data processing according to an exemplary embodiment of the present patent application.

According to an exemplary embodiment of the present disclosure, the data processing step is split into two substeps: "parse" and "process", and only requires a configuration file that describes the metadata (see FIG. 3).

According to an exemplary embodiment of the present disclosure, during the parsing step, data is extracted using the specified configurations, and the subsequent process step generates processed cyclic data that can be used for AI and statistical applications.

While the invention has been illustrated and described in detail in the drawings and foregoing description, such illustration and description are to be considered illustrative or exemplary and not restrictive.

The invention is not limited to the disclosed embodiments. Other variations to the disclosed embodiments can be understood and effected by those skilled in the art in practicing a claimed invention, from a study of the drawings, the disclosure, and the dependent claims.

In an exemplary embodiment of the present disclosure, the data processing component is configured to stop to perform cloud processing of the stored cyclic data triggered by a cycle-stop signal.

In an exemplary embodiment of the present disclosure, the data collection component is configured to collect cyclic data based on data communication over local area networks.

In an exemplary embodiment of the present disclosure, the data collection component comprises a network device.

In an exemplary embodiment of the present disclosure, the data collection component comprises a network edge device.

In an exemplary embodiment of the present disclosure, the data processing component is configured to train an artificial intelligence system using the extracted process fingerprints of the stored cyclic data.

In an exemplary embodiment of the present disclosure, the data processing component is configured to provide predictive maintenance for a robot system using the extracted process fingerprints of the stored cyclic data by discovering anomalies in the extracted process fingerprints of the robot system.

In an exemplary embodiment of the present disclosure, the data processing component is configured to provide process monitoring by tracking changes to the fingerprints over time.

In an exemplary embodiment of the present disclosure, the data processing component is configured to provide a summary of monitored cycles where changes in the fingerprints over time were tracked.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for outlier detection based on process fingerprints from robot cycle data, comprising:

a data collection device, which is configured to collect cyclic data for process monitoring, wherein the cyclic data comprises multiple vectors each of which comprises data from one individual cycle of the robot cycle data of robots of a robot fleet;

a data storage device, which is configured to store the collected cyclic data; and a data processing device comprising at least one processor, which is configured to perform cloud processing of the stored cyclic data triggered by a cycle-start signal, wherein the data processing device is configured to parse the stored cyclic data and to process the stored cyclic data based on a configuration file defining metadata of the stored cyclic data, wherein the data processing device is configured to extract process fingerprints that occur across the robots of the robot fleet and the robot cycles from the stored cyclic data using the metadata;

wherein the data processing device is configured to provide predictive maintenance for a robot system comprising the robots of the robot fleet using the extracted process fingerprints of the stored cyclic data by discovering anomalies in the extracted process fingerprints of the stored cyclic data by discovering anomalies in the extracted process fingerprints of the robot system.

2. The system according to claim 1, wherein the data processing device is configured to stop to perform cloud processing of the stored cyclic data triggered by a cycle-stop signal.

3. The system according to claim 1, wherein the data collection device is configured to collect cyclic data based on data communication over local area networks.

4. The system according to claim 1, wherein the data collection device comprises a network device.

5. The system according to claim 1, wherein the data collection device comprises a network edge device.

6. The system according to claim 1, wherein the data processing device is configured to train an artificial intelligence system using the extracted process fingerprints of the stored cyclic data.

7. The system according to claim 1, wherein the data processing device is configured to provide process monitoring by tracking changes to the fingerprints over time.

8. The system according to claim 7, wherein the data processing device is configured to provide a summary of monitored cycles where changes in the fingerprints over time were tracked.

9. A method, comprising:

collecting of cyclic data using a data collection device, wherein the cyclic data comprises multiple vectors each of which comprises data from one individual cycle of robot cycle data of the robots of a robot fleet;

storing the collected cyclic data using a data storage device;

performing cloud processing of the stored cyclic data triggered by a cycle-start signal using a data processing device;

wherein the cloud processing of the stored cyclic data comprises a step of parsing the stored cyclic data and a step of processing the stored cyclic data based on a configuration file defining metadata of the stored cyclic data, wherein the step of parsing the stored cyclic data comprises extracting process fingerprints that occur across the robots of the robot fleet and the robot cycles from the stored cyclic data using the metadata;

wherein the data processing device is configured to provide predictive maintenance for a robot system comprising the robots of the robot fleet using the extracted process fingerprints of the stored cyclic data by discovering anomalies in the extracted process fingerprints of the stored cyclic data by discovering anomalies in the extracted process fingerprints of the robot system.

10. The method according to claim 9, wherein the data processing device is configured to stop to perform cloud processing of the stored cyclic data triggered by a cycle-stop signal.

11. The method according to claim 9, wherein the data collection device is configured to collect cyclic data based on data communication over local area networks.

12. The method according to claim 9, wherein the data collection device comprises a network device.

13. The method according to claim 9, wherein the data collection device comprises a network edge device.

14. The method according to claim 9, wherein the data processing device is configured to train an artificial intelligence system using the extracted process fingerprints of the stored cyclic data.

15. The method according to claim 9, wherein the data processing device is configured to provide process monitoring by tracking changes to the fingerprints over time.

16. The method according to claim 15, wherein the data processing device is configured to provide a summary of monitored cycles where changes in the fingerprints over time were tracked.

* * * * *